(12) United States Patent
Kamada

(10) Patent No.: US 11,325,430 B2
(45) Date of Patent: May 10, 2022

(54) TIRE

(71) Applicant: BRIDGESTONE CORPORATION, Tokyo (JP)

(72) Inventor: Shiho Kamada, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days.

(21) Appl. No.: 16/760,132

(22) PCT Filed: Oct. 17, 2018

(86) PCT No.: PCT/JP2018/038592
§ 371 (c)(1),
(2) Date: Apr. 29, 2020

(87) PCT Pub. No.: WO2019/087776
PCT Pub. Date: May 9, 2019

(65) Prior Publication Data
US 2020/0346497 A1    Nov. 5, 2020

(30) Foreign Application Priority Data

Oct. 30, 2017  (JP) .............................. JP2017-209049

(51) Int. Cl.
*B60C 13/02* (2006.01)
*B60C 13/00* (2006.01)
*B60C 13/04* (2006.01)

(52) U.S. Cl.
CPC ............ *B60C 13/02* (2013.01); *B60C 13/002* (2013.01); *B60C 2013/045* (2013.01); *B60C 2200/04* (2013.01)

(58) Field of Classification Search
CPC ..... B60C 13/00; B60C 13/001; B60C 13/002; B60C 13/02
See application file for complete search history.

(56) References Cited

U.S. PATENT DOCUMENTS 4,982,773 A    1/1991  Bonko
2001/0017178 A1  8/2001  Suzuki
(Continued)

FOREIGN PATENT DOCUMENTS

EP    3 603 994 A1    2/2020
FR      3027256 A1    4/2016
(Continued)

OTHER PUBLICATIONS

Machine Translation: JP-2014076769-A, Nagayoshi Katsutomo, (Year: 2021).*

(Continued)

*Primary Examiner* — Kendra Ly
(74) *Attorney, Agent, or Firm* — Sughrue Mion, PLLC

(57) ABSTRACT

A protrusion portion (110) of a pneumatic tire is formed by a plurality of protrusion parts (111) extended along a tire circumferential direction. The protrusion parts (111) are arranged with predetermined gaps therebetween so as to form a circle along the tire circumferential direction. A length (S1) of the protrusion part (111) in the tire circumferential direction is larger than a maximum width (W1) of the protrusion part (111) in a tire radial direction. In a tire side view, a narrow groove (200) extended along the tire circumferential direction is formed on a surface (111s) of the protrusion part (111).

11 Claims, 9 Drawing Sheets

(56) References Cited

U.S. PATENT DOCUMENTS

| | | | |
|---|---|---|---|
| 2004/0112497 A1 | 6/2004 | Rooney | |
| 2011/0253278 A1 | 10/2011 | Tokizaki et al. | |
| 2015/0165831 A1 | 6/2015 | Kodama et al. | |
| 2016/0129733 A1* | 5/2016 | Fujioka | B60C 11/01 152/209.18 |
| 2018/0162178 A1* | 6/2018 | Matsumoto | B60C 13/02 |
| 2018/0229557 A1* | 8/2018 | Buffetaud | B60C 13/002 |

FOREIGN PATENT DOCUMENTS

| | | | | | |
|---|---|---|---|---|---|
| JP | 02-130803 | U | | 10/1990 | |
| JP | 04-129807 | A | | 4/1992 | |
| JP | 05-294115 | A | | 11/1993 | |
| JP | 05294115 | A | * | 11/1993 | |
| JP | 2001-225613 | A | | 8/2001 | |
| JP | 2004291938 | A | | 10/2004 | |
| JP | 2004291938 | A | * | 10/2004 | B60C 13/02 |
| JP | 2005-112010 | A | | 4/2005 | |
| JP | 2007-296993 | A | | 11/2007 | |
| JP | 2009-208641 | A | | 9/2009 | |
| JP | 2010-083195 | A | | 4/2010 | |
| JP | 2011-121447 | A | | 6/2011 | |
| JP | 2013-052749 | A | | 3/2013 | |
| JP | 2014-076769 | A | | 5/2014 | |
| JP | 2014076769 | A | * | 5/2014 | |
| JP | 2014-201131 | A | | 10/2014 | |
| JP | 2018-095042 | A | | 6/2018 | |
| WO | 2009/154008 | A1 | | 12/2009 | |
| WO | 2014/024587 | A1 | | 2/2014 | |
| WO | 2015/154895 | A1 | | 10/2015 | |
| WO | 2016062623 | A1 | | 4/2016 | |
| WO | WO-2016062623 | A1 | * | 4/2016 | B60C 13/002 |
| WO | WO-2017098163 | A1 | * | 6/2017 | B60C 13/02 |
| WO | 2018/180230 | A1 | | 10/2018 | |

OTHER PUBLICATIONS

Machine Translation: JP-2004291938-A, Obara, Masaaki, (Year: 2021).*

Machine Translation: WO-2017098163-A1, Buffetaud Benoit, (Year: 2021).*

Machine Translation: JP-05294115-A, Motogami, Fuminobu, (Year: 2021).*

International Search Report of PCT/JP2018/038592 dated Jan. 22, 2019 [PCT/ISA/210].

* cited by examiner

TIRE

CROSS REFERENCE TO RELATED APPLICATIONS

This application is a National Stage of International Application No. PCT/JP2018/038592, filed Oct. 17, 2018, claiming priority to Japanese Patent Application No. 2017-209049, filed Oct. 30, 2017.

TECHNICAL FIELD

The present invention relates to a tire capable of dealing with wear of a tire side portion, the tire being suitable to a demand for precision docking with high precision, in particular relates to a tire having a protrusion portion protruded from a surface of a side wall toward an outer side in a tire width direction.

BACKGROUND ART

Conventionally, a structure of a tire for trucks or buses that has a protrusion portion on a surface of a side wall in order to prevent damage of a tire side portion, specifically a surface of the side wall, caused by contacting a curbstone of a sidewalk, has been known.

For example, Patent Literature 1 discloses a tire for trucks or buses having a wing-like protrusion portion, which is protruded toward an outer side in a tire width direction, on a surface of a side wall closer to a tread.

The tire for trucks or buses is presupposed to be re-treaded (cold re-treaded) by using a vulcanized rubber sheet for a tread. Its object is to prevent the damage of a tire side portion of a base tire, which is to be extended in its lifetime by the re-treading forming the wing-like protrusion portion, so as to improve durability of the tire.

CITATION LIST

Patent Literature

[PTL 1] Japanese Unexamined Patent Application Publication No. 2005-112010

SUMMARY OF INVENTION

In recent years, it is desired to improve so-called precision docking of a route bus that repeatedly stops at bus stops. The precision docking denotes a degree of a distance and a degree of a level difference between a sidewalk and a doorway when the bus stops at a bus stop. The getting on/off performance is enhanced by improving the precision docking.

However, when the precision docking is improved, the surface of the side wall of the tire is rubbed with a curbstone of the sidewalk and the tire side portion is severely worn, and as a result, the failure of the tire might be caused. It is accordingly considered to form the protrusion portion described above on the side wall and to replace (also called re-side) a part of the side wall including the protrusion portion depending on the wear.

However, in a case in which the protrusion portion is merely formed, the protrusion portion is not worn evenly, and therefore the side wall might be replaced although a part of the protrusion portion is largely remained.

Such a situation is unfavorable from a viewpoint of suppression of a cost for manufacturing and maintaining the tire and protection for the environment. Further, the increase of the rolling resistance and the weight caused by forming the protrusion portion should be avoided as much as possible due to a desire to improve an environmental performance.

Also, in a case in which the protrusion portion is merely formed, advertent stress is applied to the protrusion portion, and as a result, damage such as a crack might be generated in or around the protrusion portion.

Accordingly, an object of the present invention is, in consideration of the problem described above, to provide a tire for which a side wall having a protrusion portion thereon can be replaced, the tire being capable of achieving both of sufficient durability of the protrusion portion and high environment performance of the tire.

One aspect of the present invention is a tire (for example, pneumatic tire 10) including a protrusion portion (for example, protrusion portion 110) protruded from a surface of a side wall (side wall 100a) toward an outer side in a tire width direction. The protrusion portion is formed by a plurality of protrusion parts (protrusion parts 111) extended along a tire circumferential direction. The protrusion parts are arranged with predetermined gaps (gaps 105) therebetween so as to form a circle along the tire circumferential direction. A length of the protrusion part in the tire circumferential direction (tire circumferential direction size S1) is larger than a maximum width (maximum width W1) of the protrusion part in a tire radial direction. In a tire side view, a narrow groove (narrow groove 200) extended along the tire circumferential direction is formed on a surface (surface 110s) of the protrusion part.

DESCRIPTION OF EMBODIMENTS

Hereinafter, an embodiment of the present invention will be described with reference to the drawings. The same reference signs or similar reference signs are assigned to the same functions or the same components and the description thereof is omitted as needed.

(1) Schematic Whole Configuration of Tire

Figure 1:
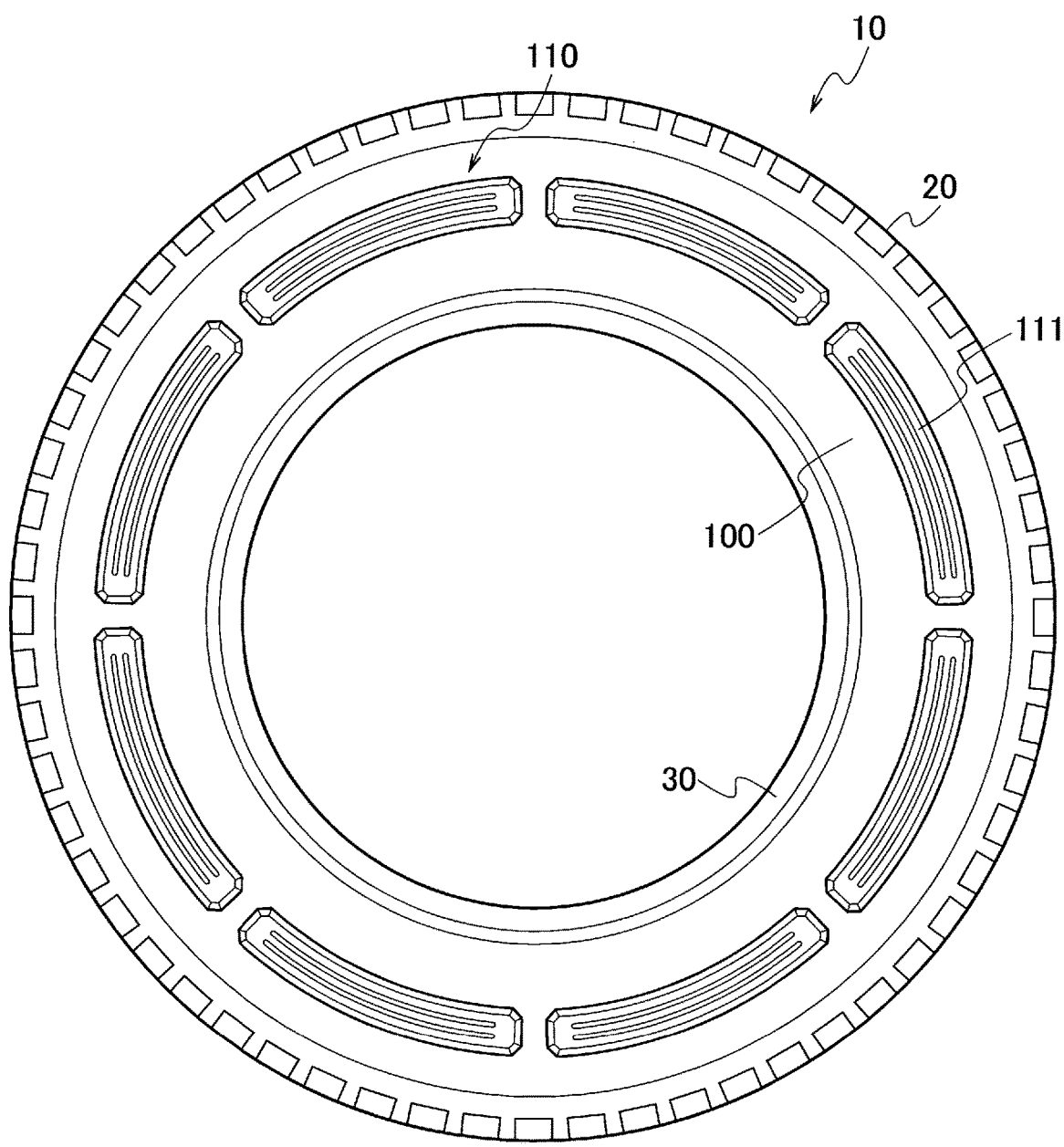
FIG. 1 is a side view illustrating a whole of a pneumatic tire 10.

FIG. 1 is a side view illustrating a whole of a pneumatic tire 10. The pneumatic tire 10 is formed as a radial tire for trucks or buses (heavy load pneumatic tire), especially formed as a tire mounted to a route bus that repeatedly stops at bus stops. A size of the pneumatic tire 10 is not especially limited, however examples of a general size of the tire used for the route bus include 275/70R22.5, 245/70R19.5 and 205/80R17.5.

The pneumatic tire 10 is provided with a tread portion 20 that contacts a road surface, and a bead portion 30 mounted to a wheel rim (not shown). Further, the pneumatic tire 10 is provided with a tire side portion 100 formed between the tread portion 20 and the bead portion 30.

Although it is not illustrated in FIG. 1 and others, similar to a general heavy load pneumatic tire, the pneumatic tire 10 is provided with a carcass ply that forms a frame of the pneumatic tire 10, a pair of crossing belt layers arranged at an inner side of the tread portion 20 in a tire radial direction, and the like.

In the tread portion 20, a pattern (tread pattern) suitable to a property of a vehicle (bus) to which the pneumatic tire 10 is mounted (for example, a mainly low speed travelling vehicle or a mainly high speed travelling vehicle) and performance of the pneumatic tire 10 to be required (for example, low rolling resistance or wear resistance) is formed.

A protrusion portion 110 is formed on the tire side portion 100. The protrusion portion 110 is formed on a surface of a side wall 100a that forms an outer side wall surface of the tire side portion 100.

The protrusion portion 110 is protruded from the surface of the side wall 100a toward an outer side in the tire width direction. The protrusion portion 110 contacts a curbstone 300 (not shown in FIG. 1, see FIG. 5) first when the vehicle stops at a bus stop.

The protrusion portion 110 is formed by a plurality of protrusion parts 111 extended along a tire circumferential direction. In the present embodiment, the protrusion portion 110 is formed by eight protrusion parts 111 extended along the tire circumferential direction.

In this way, the protrusion parts 111 are arranged with predetermined gaps therebetween in the tire circumferential direction. That is, the protrusion parts 111 are arranged with the predetermined gaps therebetween so as to form a circle along the tire circumferential direction.

The protrusion part 111 is formed of a rubber material similar to the tire side portion 100. The protrusion part 111 may be formed of a rubber material having a friction coefficient lower than that of the other part in the tire side portion 110.

For example, a filler within a specific compounded range and a specific amide compound are added to the rubber composition adopted for the protrusion part 111. Specifically, the rubber composition contains 30 parts by mass or more of carbon black, 10 parts by mass or less of silica, and 0.1-10 parts by mass of fatty acid amide based on 100 parts by mass of a rubber component.

The rubber component preferably contains 50 mass % or more of a diene rubber, more preferably 80 mass % or more of the diene rubber, most preferably 100 mass % of the diene rubber.

Examples of the diene rubber include a natural rubber (NR), a polyisoprene rubber (IR), a polybutadiene rubber (BR), a styrene-butadiene copolymer rubber (SBR), an ethylene-propylene-diene rubber (EPDM), a chloroprene rubber (CR), a butyl rubber (IIR), a halogenated butyl rubber, and an acrylonitrile-butadiene rubber (NBR).

The carbon black contained in the rubber composition is not especially limited. The carbon black having the grade of IISAF, N339, HAF, FEF, or GPF may be adopted. The fatty acid amide having a carbon number of 8-22 is preferable as the fatty acid amide contained in the rubber composition. Examples of the fatty acid amide include caprylic acid amide, lauric acid amide, myristic acid amide, palmitic acid amide, stearic acid amide, behenic acid amide, erucic acid amide, oleic acid amide, linoleic acid amide, and linolenic acid amide.

(2) Configuration of Protrusion Portion 110

Figure 2:
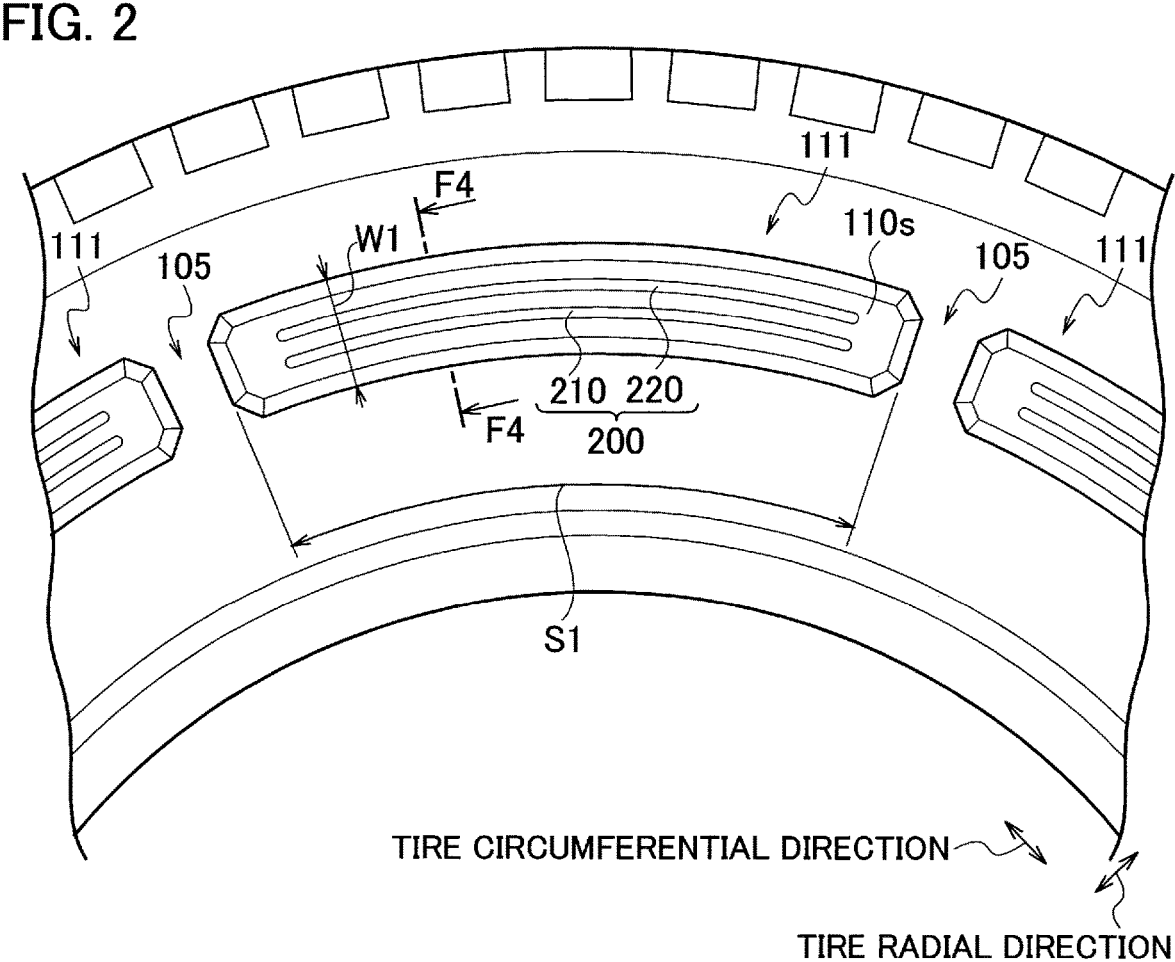
FIG. 2 is an enlarged side view illustrating a part of a protrusion portion 110.

Next, a specific configuration of the protrusion portion 110 will be described. FIG. 2 is an enlarged side view illustrating a part of the protrusion portion 110.

As shown in FIG. 2, the protrusion parts 111 adjacent to each other are arranged with a gap 105 therebetween so as to form a circle along the tire circumferential direction. In the present embodiment, the gaps 105 between the eight protrusion parts 111 are identical. That is, the protrusion parts 111 are arranged at the same intervals in the tire circumferential direction.

A length of the protrusion part 111 in the tire circumferential direction (tire circumferential direction size S1) is larger than a maximum width W1 of the protrusion part 111 in the tire radial direction. That is, in a tire side view, the protrusion part 111 is formed in an arc shape having a predetermined width in the tire radial direction. In other words, the protrusion part 111 is a band with an arc shape extended in the tire circumferential direction.

Further, as shown in FIG. 2, in the tire side view, a narrow groove 200 extended along the tire circumferential direction is arranged on a surface 110s of the protrusion part 111.

Specifically, the narrow groove 200 includes a first narrow groove 210 and a second narrow groove 220. The first narrow groove 210 is arranged at an inner side in the tire radial direction. The second narrow groove 220 is arranged at an outer side in the tire radial direction with respect to the first narrow groove 210.

Each of the first narrow groove 210 and the second narrow groove 220 is formed in an arc shape extended in the tire circumferential direction, similar to the protrusion part 111.

Figure 3:
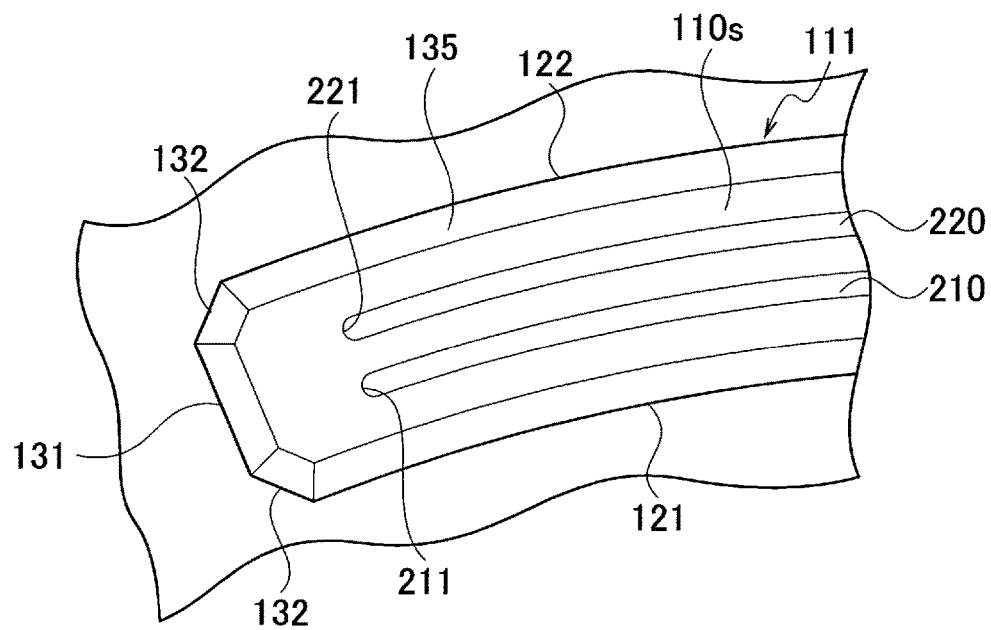
FIG. 3 is an enlarged side view illustrating a part of a protrusion part 111.

FIG. 3 is an enlarged side view illustrating a part of the protrusion part 111. As shown in FIG. 3, in the tire side view, the protrusion part 111 includes an inner side portion 121 extended along the tire circumferential direction at an inner side in the tire radial direction and an outer side portion 122 extended along the tire circumferential direction at an outer side in the tire radial direction with respect to the inner side portion 121.

The protrusion part 111 further includes a radial direction side portion 131 extended in the tire radial direction. The radial direction side portion 131 is continued to one end of the inner side portion 121 and one end of the outer side portion 122.

In the present embodiment, a corner of the protrusion part 111 where the inner side portion 121 and the radial direction side portion 131 intersect to each other is chamfered in the tire side view. The other end side of the protrusion part 111 in the tire circumferential direction is similar to that described above (see FIG. 2). Specifically, a chamfered portion 132 is formed on the corner of the protrusion part 111.

Further, in the present embodiment, an outer peripheral portion of the surface 110s of the protrusion part 111 is chamfered in the tire side view. Specifically, a corner where the surface 110s of the protrusion part 111 and the inner side portion 121 intersect to each other is chamfered.

More specifically, a chamfered portion 135 is formed on the corner of the protrusion part 111. Similarly, a corner where the surface 110s and the outer side portion 122 intersect to each other and a corner where the surface 110s and the radial direction side portion 131 intersect to each other are also chamfered. That is, the chamfered portion 135 is arranged to form a circle on the outer peripheral portion of the protrusion part 111.

The narrow groove 200, namely each of the first narrow groove 210 and the second narrow groove 220, is not opened to an end of the protrusion part 111 in the tire circumferential direction but terminated within the protrusion part 111. Specifically, each of the first narrow groove 210 and the second narrow groove 220 is not opened to the radial direction side portion 131 but terminated within the protrusion part 111.

Further, in the tire side view, an end of the narrow groove 220 (first narrow groove 210 and second narrow groove 220) in the tire circumferential direction is formed round without an edge. Specifically, an end 211 of the first narrow groove 210 is formed in a semicircular shape in the tire side view. Also, an end 221 of the second narrow groove 220 is formed in a semicircular shape in the tire side view. That is, each of the end 211 and the end 221 is formed in a shape having a curvature (round shape).

Figure 4:
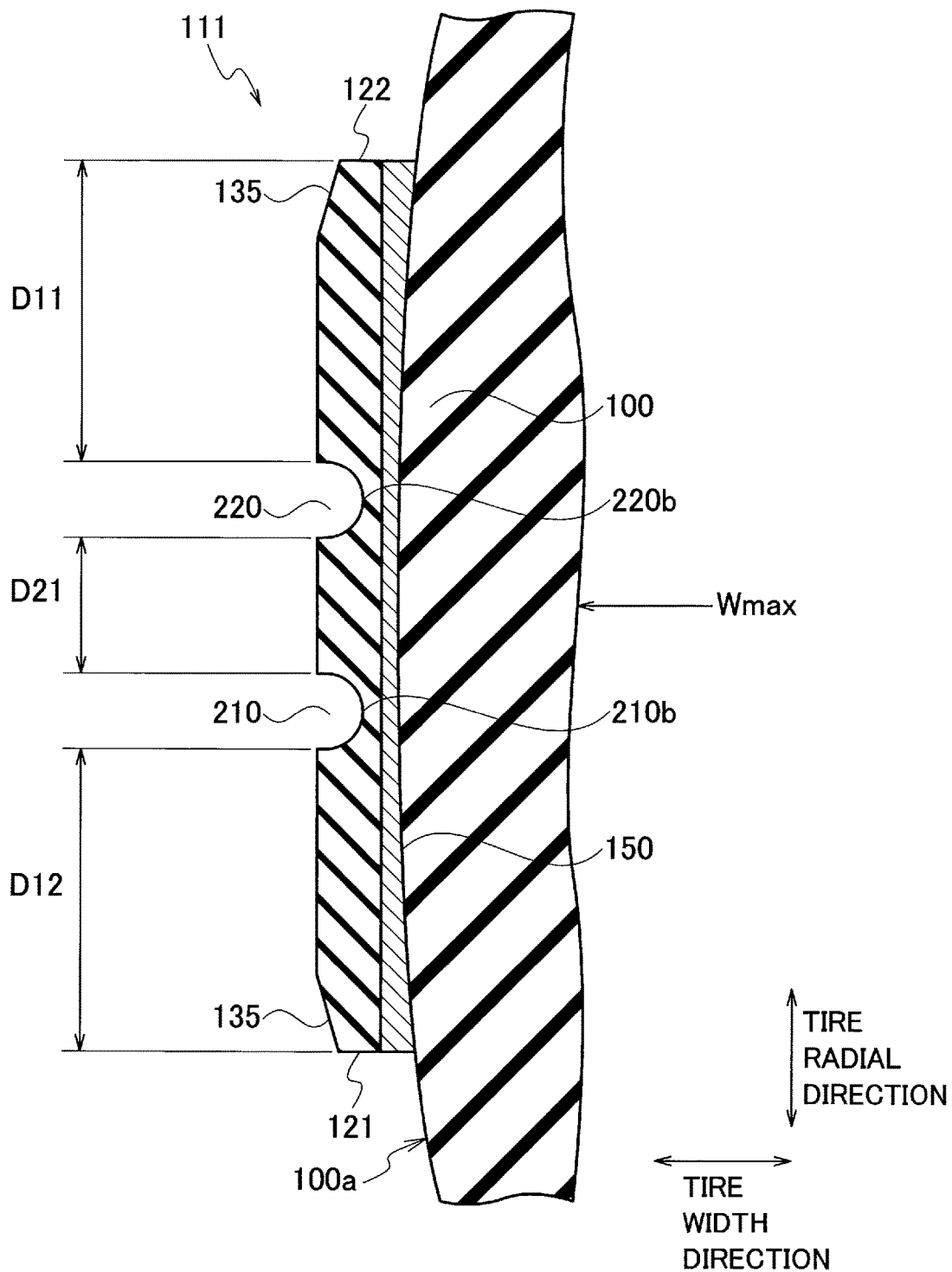
FIG. 4 is a cross-sectional view illustrating a part of a tire side portion 100 including the protrusion part 111 taken along line F4-F4 in FIG. 2.

FIG. 4 is a cross-sectional view illustrating a part of the tire side portion 100 including the protrusion part 111 taken along line F4-F4 in FIG. 2. As shown in FIG. 4, the protrusion part 111 is protruded from the side wall 100a to an outer side in the tire width direction.

The protrusion part 111 is formed on the side wall 100a via an adhesive rubber layer 150. In the present embodiment, a thickness of the protrusion part 111 in the tire width direction is 3.0 mm, a thickness of the adhesive rubber layer 150 in the tire width direction is 1.5 mm. A whole or a part of the adhesive rubber layer 150 may be removed together with the protrusion part 111 when the worn protrusion part 111 is replaced (re-side). Further, in the present embodiment, only the worn protrusion part 111 is presupposed to be replaced, however a part of the tire side portion 100 (specifically, the side wall 100a) may be replaced together with the protrusion part 111.

A width of each of the first narrow groove 210 and the second narrow groove 220 in the tire radial direction is 3.5 mm. A width of the chamfered portion 135 is also 3.5 mm. A height (thickness) of each of the inner side portion 121 and the outer side portion 122 in the tire width direction is 2.0 mm. That is, by forming the chamfered portion 135, the height of each of the inner side portion 121 and the outer side portion 122 is lower than the height of the surface 110s by 1.0 mm.

A position of the protrusion part 111 in the tire radial direction is not especially limited, however considering the contact with the curbstone 300 (see FIG. 5), it may be considered that the protrusion part 111 is arranged in a region including a maximum width position Wmax in the tire width direction.

In the present embodiment, a distance D11 between an outer end of the protrusion part 111 in the tire radial direction (position of the outer side portion 122) and an outer end of the second narrow groove 220 in the tire radial direction is longer than a distance D21 between an outer end of the first narrow groove 210 in the tire radial direction and an inner end of the second narrow groove 220 in the tire radial direction.

Further, a distance D12 between an inner end of the protrusion part 111 in the tire radial direction (position of the inner side portion 121) and an inner end of the first narrow groove 210 in the tire radial direction is longer than the distance D21 between the outer end of the first narrow groove 210 in the tire radial direction and the inner end of the second narrow groove 220 in the tire radial direction.

That is, a length of the surface 110s between the end of the protrusion part 111 and the end of the narrow groove 200 in the tire radial direction is longer than a length of the surface 110s between the first narrow groove 210 and the second narrow groove 220.

In the present embodiment, as shown in FIG. 4, a groove bottom of the narrow groove 200 is formed round without an edge in a sectional view along the tire width direction and the tire radial direction. That is, the groove bottom of the narrow groove 200 formed in a shape having a curvature (round shape).

Specifically, a groove bottom 210b of the first narrow groove 210 is formed in a semicircular shape. Also, a groove bottom 220b of the second narrow groove 220 is formed in a semicircular shape.

(3) Functions and Effects

Figure 5:
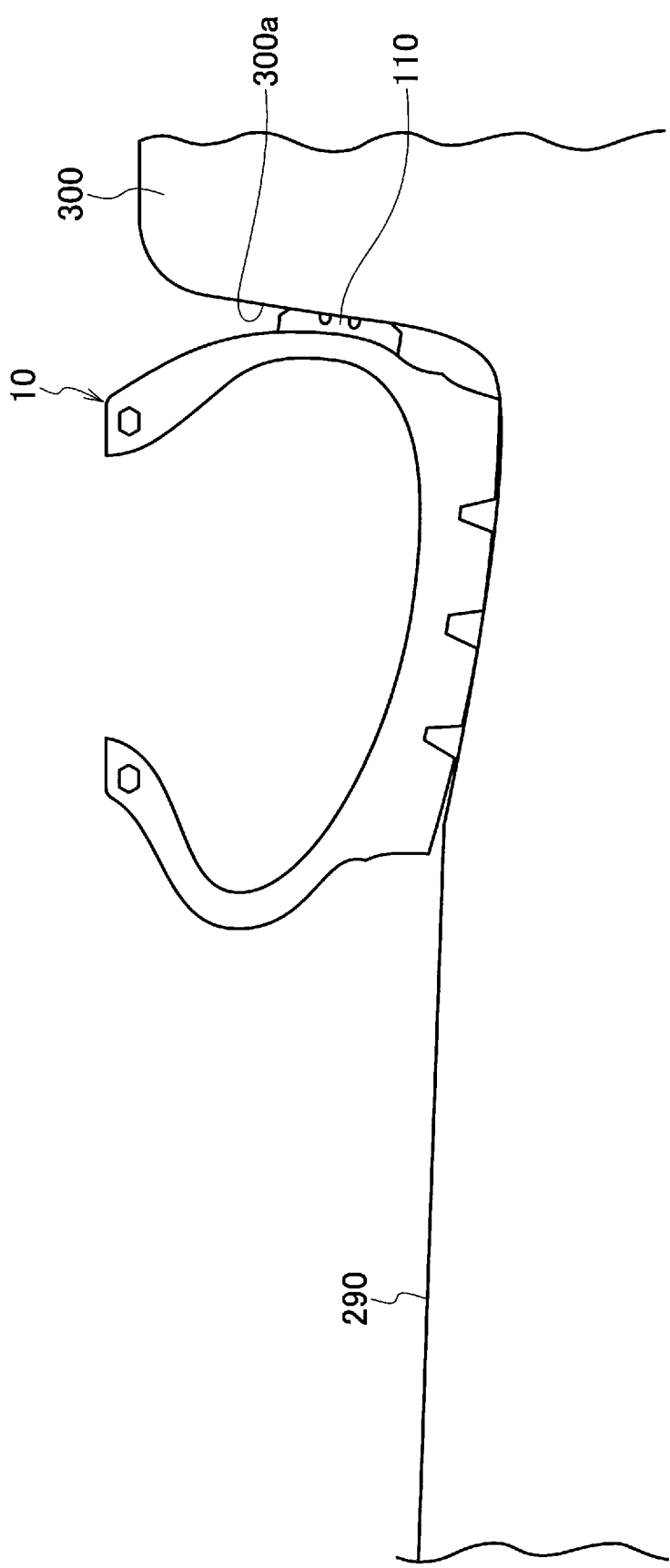
FIG. 5 is a schematic view illustrating the pneumatic tire 10, which is mounted to a vehicle (not shown), contacting a curbstone 300.

Next, effects of the pneumatic tire 10 having the protrusion portion 110 will be described. FIG. 5 is a schematic view illustrating the pneumatic tire 10, which is mounted to a vehicle (not shown), contacting the curbstone 300.

As shown in FIG. 5, when the vehicle travelling on the road surface 290 approaches the curbstone 300, the protrusion portion 110 of the pneumatic tire 10 contacts a side surface 300a of the curbstone 300 first. With this, wear of the tire side portion 100 (the surface of the side wall 100a) caused by being rubbed directly with the curbstone 300 and failure caused by the wear can be prevented.

In this way, the protrusion portion 110 is served as a sacrificial worn portion that is worn prior to other part.

The protrusion portion 110 is formed by the protrusion parts 111 arranged with the predetermined gaps therebetween so as to form a circle along the tire circumferential direction. With this, only the protrusion part 111, which is worn largely, can be replaced (re-side).

Further, since the gap 105 is formed between the protrusion parts 111 adjacent to each other, an amount of rubber can be decreased while securing a necessary function of the protrusion portion 110 that protects the tire side portion 100. With this, a weight increase of the pneumatic tire 10 can be suppressed and thereby the rolling resistance thereof can be decreased.

Further, the tire circumferential direction size S1 of the protrusion part 111 is larger than the maximum width W1 of the protrusion part 111 in the tire radial direction. In the tire side view, the narrow groove 200 extended along the tire circumferential direction is formed on the surface 110s of the protrusion part 111.

With this, even when the protrusion part 111 contacts the side surface 300a of the curbstone 300 and thereby the stress is caused in the protrusion part 111, the stress is hardly concentrated on a specific part of the protrusion part 111 and therefore the durability of the protrusion part 111 can be improved.

That is, according to the pneumatic tire 10 for which the side wall 100a having the protrusion portion 110 thereon can be replaced, both of sufficient durability of the protrusion portion 110 and high environment performance of the pneumatic tire 10 can be obtained.

In the present embodiment, the narrow groove 200 (first narrow groove 210 and second narrow groove 220) is not opened to the end of the protrusion part 111 in the tire circumferential direction (radial direction side portion 131) but terminated within the protrusion part 111.

Thus, the end of the narrow groove 200 in the tire circumferential direction is not exposed to the radial direction side portion 131, and thereby it can be avoided that the stress is concentrated on a specific part of the radial direction side portion 131 when contacting the curbstone 300. With this, a possibility of a crack caused in the protrusion part 111 can be decreased and the durability of the protrusion part 111 can be further improved.

In the present embodiment, the narrow groove 200 is formed by two narrow grooves of the first narrow groove 210 arranged at the inner side in the tire radial direction and the second narrow groove 220 arranged at the outer side in the tire radial direction with respect to the first narrow groove 210. With this, the strain on the surface 110s due to the deformation of the protrusion part 111 when contacting the curbstone 300 can be dispersed efficiently.

In particular, in the present embodiment, the distance D11 between the outer end of the protrusion part 111 in the tire radial direction (position of the outer side portion 122) and the outer end of the second narrow groove 220 in the tire radial direction is longer than the distance D21 between the outer end of the first narrow groove 210 in the tire radial direction and the inner end of the second narrow groove 220 in the tire radial direction. Further, the distance D12 between the inner end of the protrusion part 111 in the tire radial direction (position of the inner side portion 121) and the inner end of the first narrow groove 210 in the tire radial direction is longer than the distance D21 between the outer end of the first narrow groove 210 in the tire radial direction and the inner end of the second narrow groove 220 in the tire radial direction.

That is, the length of the surface 110s between the end of the protrusion part 111 and the end of the narrow groove 200 in the tire radial direction is longer than the length of the surface 110s between the first narrow groove 210 and the second narrow groove 220.

With this, it can be prevented that, when contacting the curbstone 300, the stress is concentrated on the first narrow groove 210 and the second narrow groove 220, in particular the groove bottom 210b and the groove bottom 220b. Further, in the present embodiment, each of the groove bottom 210b and the groove bottom 220b is formed round without an edge in the sectional view along the tire width direction and the tire radial direction. With this, a possibility of a crack caused in the groove bottom 210b and the groove bottom 220b can be decreased and the durability of the protrusion part 111 can be further improved.

In the present embodiment, in the tire side view, the protrusion part 111 is formed in an arc shape having a predetermined width in the tire radial direction, and the chamfered portion 132 is formed on the protrusion part 111. With this, it can be avoided that the stress is concentrated on the corner of the protrusion part 111. Consequently, a possibility of a crack caused in the protrusion part 111 can be decreased and the durability of the protrusion part 111 can be further improved.

(4) Other Embodiments

As described above, the contents of the present invention are described with reference to the examples, however the present invention is not limited to those descriptions. It is obvious for a person skilled in the art to adopt various modifications and improvement.

Figure 6:
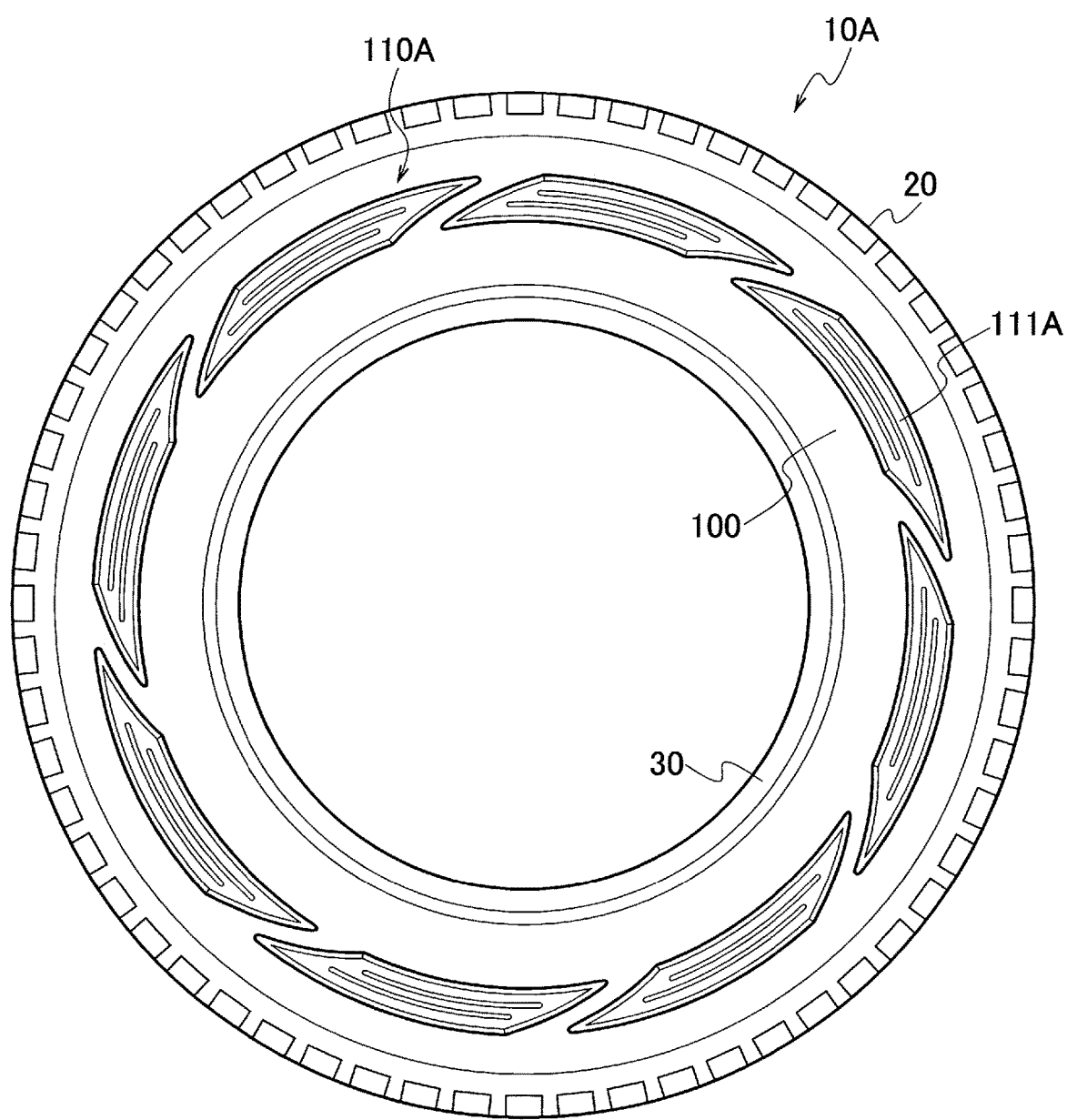
FIG. 6 is a side view illustrating a whole of a pneumatic tire 10A according to a modified example.

For example, the protrusion portion 110 described above may be modified as below. FIG. 6 is a side view illustrating a whole of a pneumatic tire 10A according to a modified example. Hereinafter, a configuration different from that of the pneumatic tire 10 described above is mainly described.

As shown in FIG. 6, a protrusion portion 110A is firmed on a tire side portion 100 of the pneumatic tire 10A. The protrusion portion 110A is formed by a plurality of protrusion parts 111A extended along the tire circumferential direction. The protrusion portion 110A is formed by eight protrusion parts 111A extended along the tire circumferential direction.

Figure 7:
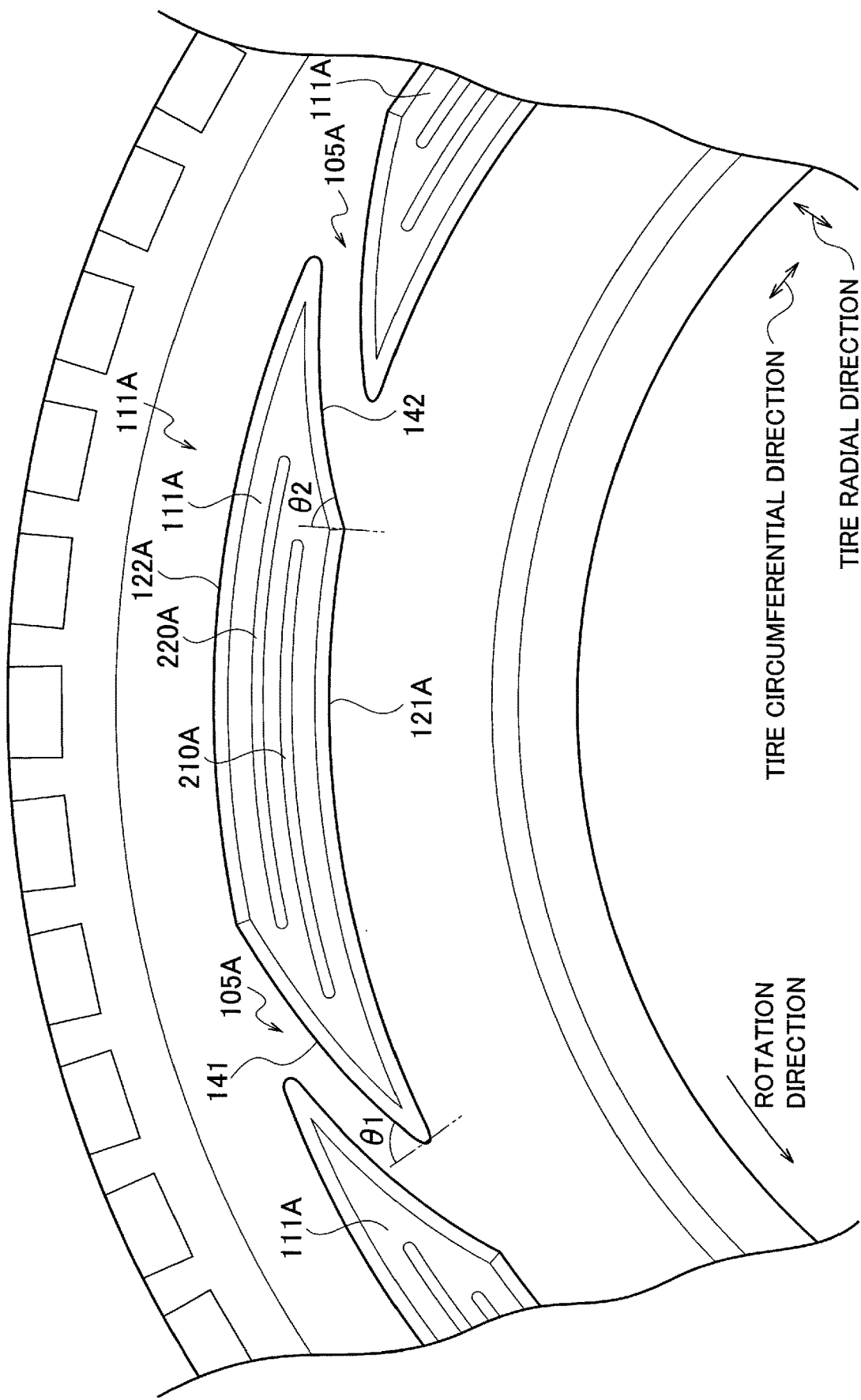
FIG. 7 is an enlarged side view illustrating a part of a protrusion portion 110A.

FIG. 7 is an enlarged side view illustrating a part of the protrusion portion 110A. As shown in FIG. 7, the protrusion parts 111A adjacent to each other are arranged with a gap 105A therebetween so as to form a circle along the tire circumferential direction.

In the tire side view, the protrusion part 111A includes an inner side portion 121A extended along the tire circumferential direction at an inner side in the tire radial direction and an outer side portion 122A extended along the tire circumferential direction at an outer side in the tire radial direction with respect to the inner side portion 121A. Further, the protrusion part 111A includes a first radial direction side portion 141 continued to one end of the inner side portion 121A and one end of the outer side portion 122A, and a second radial direction side portion 142 continued to the other end of the inner side portion 121A and the other end of the outer side portion 122A.

Further, a first narrow groove 210A and a second narrow groove 220A are formed on the protrusion part 111A. Each of the first narrow groove 210A and the second narrow groove 220A is formed in an arc shape extended in the tire circumferential direction.

The first radial direction side portion 141 and the second radial direction side portion 142 are inclined in the same direction against the tire radial direction, in the tire side view. An inclined angle $\theta1$ of the first radial direction side portion 141 against the tire radial direction is smaller than an inclined angle $\theta2$ of the second radial direction side portion 142 against the tire radial direction. That is, the second radial direction side portion 142 is inclined against the tire radial direction more than the first radial direction side portion 141. Accordingly, the gap 105A is also formed to be inclined against the tire radial direction in accordance with the shape of each of the first radial direction side portion 141 and the second radial direction side portion 142.

In this way, the protrusion part 111A is different from the protrusion part 111 in the inclined angles of the first radial direction side portion 141 and the second radial direction side portion 142 against the tire radial direction. As shown in FIG. 2 and others, the radial direction side portion 131 of the protrusion part 111 is extended along the tire radial direction, namely extended parallel to the tire radial direction. On the other hand, the first radial direction side portion 141 and the second radial direction side portion 142 of the protrusion part 111A are extended not to be parallel to the tire radial direction but to be inclined against the tire radial direction.

A rotation direction (see an arrow in FIG. 7) of the pneumatic tire 10A is designated, and when approaching the curbstone 300, the first radial direction side portion 141 contacts the curbstone 300 first and then the second radial direction side portion 142 contacts the curbstone 300.

According to such a protrusion portion 110A, the first radial direction side portion 141 and the second radial direction side portion 142 are inclined against the tire radial direction such that a front end and a rear end of the protrusion part 111A in the tire circumferential direction are tapered toward respective distal ends, and therefore an area of the protrusion part 111A contacting the curbstone 300 can be substantially decreased at the front end and the rear end thereof. Consequently, the durability of the protrusion portion 110A can be further improved.

Figure 8:
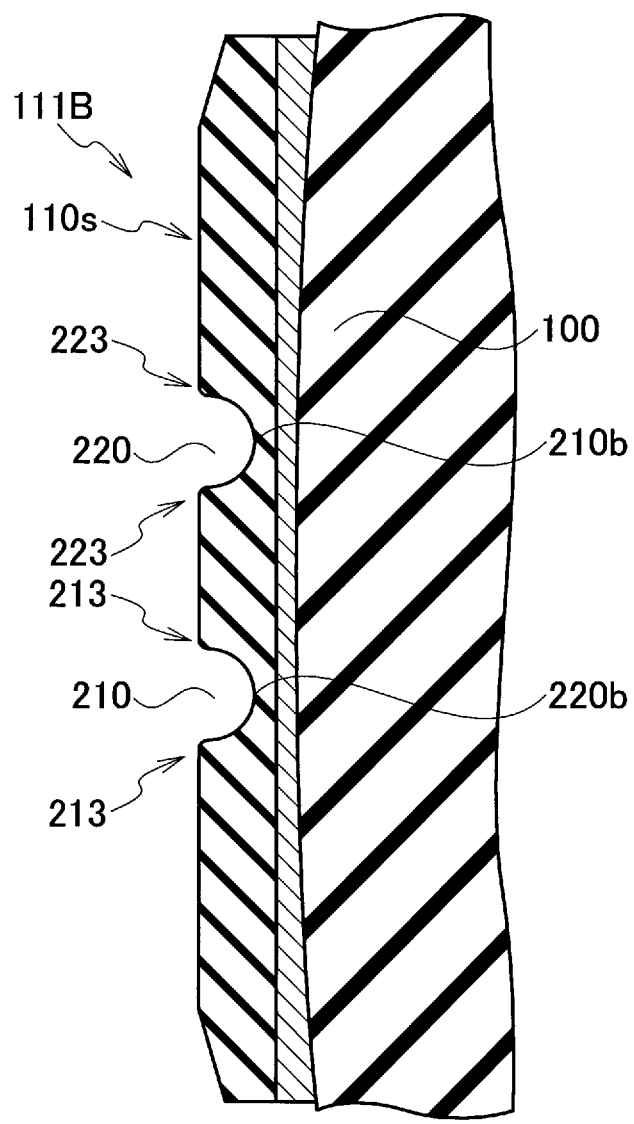
FIG. 8 is a cross-sectional view illustrating a part of a tire side portion 100 including a protrusion part 111B according to another modified example.

Further, the shapes of the first narrow groove 210 and the second narrow groove 220 of the protrusion part 111 described above may be modified as below. FIG. 8 is a cross-sectional view illustrating a part of a tire side portion 100 including a protrusion part 111B according to another modified example.

As shown in FIG. 8, the protrusion part 111B is formed such that a narrow groove 200 continued to a surface 110s of the protrusion part 111B, specifically an outer end of the first narrow groove 210 in the tire width direction, is formed round without an edge, compared to the protrusion part 111 (see FIG. 4). Specifically, an end 213 of the outer end of the first narrow groove 210 in the tire width direction is formed round. That is, the end 213 is formed in a shape having a curvature (round shape).

Similarly, an end 223 of the second narrow groove 220 is formed round to have a curvature (round shape).

According to the protrusion part 111B, the stress is hardly concentrated on the end 213 and the end 223, and thereby the durability of the protrusion part 111B can be further improved.

Figure 9:
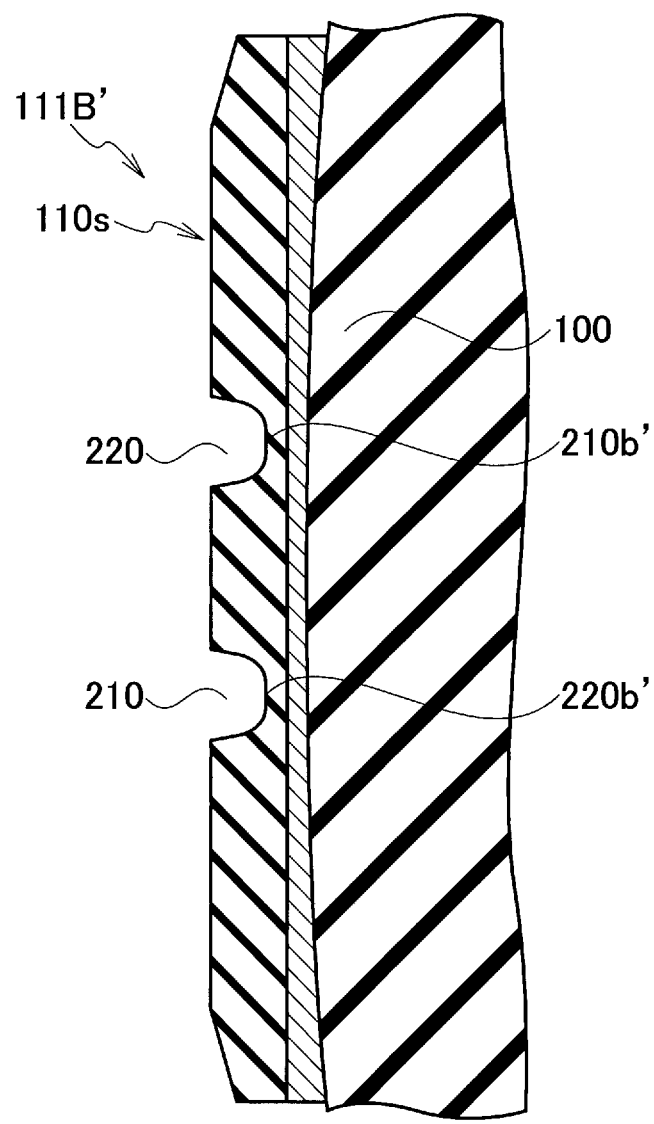
FIG. 9 is a cross-sectional view illustrating a part of a tire side portion 100 including a protrusion part 111B' according to another modified example.

Further, the shapes of the first narrow groove 210 and the second narrow groove 220 of the protrusion part 111 described above may be modified as below. FIG. 9 is a cross-sectional view illustrating a part of a tire side portion 100 including a protrusion part 111B' according to another modified example.

As shown in FIG. 9, the protrusion part 111B' is different from the protrusion part 111, in shapes of groove bottoms of the first narrow groove 210 and the second narrow groove 220. Specifically, a groove bottom 210b' of the first narrow groove 210 is not formed in a sectional shape having a semicircular shape (bowl shape) like the groove bottom 210b (see FIG. 4) but formed in a round shape in which a boundary between a linear bottom and a groove wall of the protrusion part 111B' has a curvature. A groove bottom 220b' of the second narrow groove 220 is similar to the groove bottom 210b'.

With the shapes of the groove bottom 210b' and the groove bottom 220b' of the protrusion part 111B', a possibility of a crack caused in the groove bottom 210b' and the groove bottom 220b' can be decreased, and thereby the durability of the protrusion part 111B' can be further improved.

Further, the first narrow groove 210 and the second narrow groove 220 of the protrusion part 111 described above are terminated within the protrusion part 111, however the first narrow groove 210 and the second narrow groove 220 may be opened to the radial direction side portion 131.

Figure 10:
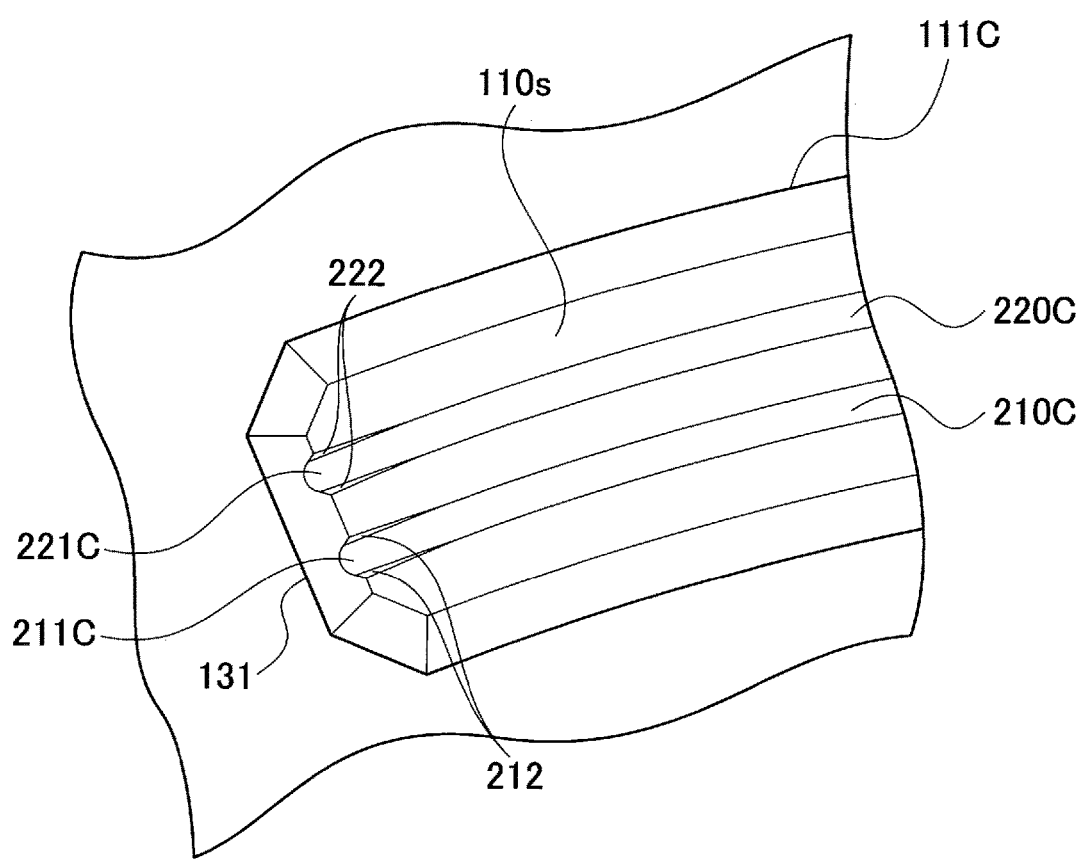
FIG. 10 is an enlarged side view illustrating a part of a protrusion part 111C according to the other modified example.

FIG. 10 is an enlarged side view illustrating a part of a protrusion part 111C according to the other modified example. As shown in FIG. 10, a first narrow groove 210C and a second narrow groove 220C opened to the radial direction side portion 131 are formed on the protrusion part 111C.

Specifically, an end 211C of the first narrow groove 210C and an end 221C of the second narrow groove 220C are opened to the radial direction side portion 131.

The first narrow groove 210C has a chamfered portion 212 for which a part of the first narrow groove 210C continued to the surface 110s of the protrusion part 111C is chamfered. Similarly, the second narrow groove 220C has a chamfered portion 222 for which a part of the second narrow groove 220C continued to the surface 110s of the protrusion part 111C is chamfered. The chamfered portion 212 (chamfered portion 222) is formed to be wider toward the end 211C (end 221C).

According to the protrusion part 111C, since the end 211C and the end 221C are opened to the radial direction side portion 131, the followability of the protrusion part 111C to the deformation can be improved. Further, since the chamfered portion 212 (chamfered portion 222) formed to be wider toward the end 211C (end 221C) is formed, although the first narrow groove 210C (second narrow groove 220C) is opened, it can be suppressed that the stress is concentrated on a specific part of the radial direction side portion 131.

That is, according to the protrusion part 111C, the followability of the protrusion part 111C to the deformation can be improved while securing the durability thereof.

In the embodiments described above, two narrow grooves (first narrow groove 210 and second narrow groove 220) extended in the tire circumferential direction are formed on the protrusion part 111, however three narrow grooves or more extended in the tire circumferential direction may be formed on the protrusion part 111. The number of the narrow grooves formed on the protrusion part 111 may be determined in accordance with a size (specifically, maximum width W1) of the protrusion part 111 in the tire circumferential direction. It is preferable to increase the number of the narrow grooves as the maximum width W1 becomes larger.

Further, in the embodiments described above, the protrusion part 111 is formed of a rubber material having a friction coefficient lower than that of the other part in the tire side portion 100, however the rubber composition adopted for the protrusion part 111 may not be formed of the rubber material having a friction coefficient lower than that of the other part in the tire side portion 100.

As described above, the embodiments of the present invention are described, however the present invention is not limited to the description and the drawings forming a part of the present disclosure. Various modifications, examples, and operation techniques will be apparent from the present disclosure to a person skilled in the art.

REFERENCE SIGNS LIST 10, 10A: pneumatic tire
20: tread portion
30: bead portion
100: tire side portion
100a: side wall
105, 105A: gap
110, 110A: protrusion portion
110s: surface
111, 111A, 111B, 111B', 111C: protrusion part
121, 121A: inner side portion
122, 122A: outer side portion
131: radial direction side portion
132: chamfered portion
135: chamfered portion
141: first radial direction side portion
142: second radial direction side portion 150: adhesive rubber layer
200: narrow groove
210, 210A, 210C: first narrow groove
210b, 210b': groove bottom
211, 211C: end
212: chamfered portion
213: end
220, 220A, 220C: second narrow groove
220b, 220b': groove bottom
221, 221C: end
222: chamfered portion
223: end
290: road surface
300: curbstone
300a: side surface

The invention claimed is:

1. A tire comprising a protrusion portion protruded from a surface of a side wall toward an outer side in a tire width direction,
wherein the protrusion portion is formed by a plurality of protrusion parts extended along a tire circumferential direction,
wherein the protrusion parts are arranged with predetermined gaps therebetween to form a circle along the tire circumferential direction,
wherein a length of the protrusion part in the tire circumferential direction is larger than a maximum width of the protrusion part in a tire radial direction, and
wherein, in a tire side view, a narrow groove extended along the tire circumferential direction is formed on a surface of the protrusion part,
wherein both ends of the narrow groove are not opened to an end of the protrusion part in the tire circumferential direction but terminated within the protrusion part,
wherein the narrow groove includes at least a first narrow groove arranged at an inner side in the tire radial direction and a second narrow groove arranged at an outer side in the tire radial direction with respect to the first narrow groove,
wherein, in the tire side view, the protrusion part includes: an inner side portion extended along the tire circumferential direction at an inner side in the tire radial direction; an outer side portion extended along the tire circumferential direction at an outer side in the tire radial direction with respect to the inner side portion; a first radial direction side portion continued to one end of the inner side portion and one end of the outer side portion; and a second radial direction side portion continued to the other end of the inner side portion and the other end of the outer side portion,
wherein the first radial direction side portion and the second radial direction side portion are inclined in the same direction against the tire radial direction in the tire side view, and
wherein an inclined angle of the first radial direction side portion against the tire radial direction is smaller than an inclined angle of the second radial direction side portion against the tire radial direction.

2. The tire according to claim 1, wherein an outer end of the narrow groove in the tire width direction continued to the surface of the protrusion part is formed round without an edge.

3. The tire according to claim 1, wherein, in the tire side view, the protrusion part is formed in an arc shape having a predetermined width in the tire radial direction, and
wherein, in the tire side view, a corner of the protrusion part is chamfered.

4. The tire according to claim 1, wherein a distance between an outer end of the protrusion part in the tire radial direction and an outer end of the second narrow groove in the tire radial direction is longer than a distance between an outer end of the first narrow groove in the tire radial direction and an inner end of the second narrow groove in the tire radial direction.

5. The tire according to claim 4, wherein a groove bottom of the narrow groove is formed round without an edge in a sectional view along the tire width direction and the tire radial direction.

6. The tire according to claim 4, wherein an outer end of the narrow groove in the tire width direction continued to the surface of the protrusion part is formed round without an edge.

7. The tire according to claim 1, wherein a distance between an inner end of the protrusion part in the tire radial direction and an inner end of the first narrow groove in the tire radial direction is longer than a distance between an outer end of the first narrow groove in the tire radial direction and an inner end of the second narrow groove in the tire radial direction.

8. The tire according to claim 7, wherein a groove bottom of the narrow groove is formed round without an edge in a sectional view along the tire width direction and the tire radial direction.

9. The tire according to claim 7, wherein an outer end of the narrow groove in the tire width direction continued to the surface of the protrusion part is formed round without an edge.

10. The tire according to claim 1, wherein a groove bottom of the narrow groove is formed round without an edge in a sectional view along the tire width direction and the tire radial direction.

11. The tire according to claim 10, wherein an outer end of the narrow groove in the tire width direction continued to the surface of the protrusion part is formed round without an edge.

* * * * *